Patented Mar. 10, 1953

2,631,141

UNITED STATES PATENT OFFICE 2,631,141

COPOLYMERS OF UNSATURATED ESTERS OF PHTHALIC ACID

Daniel Swern and Edmund F. Jordan, Jr., Philadelphia, Pa., assignors to the United States of America as represented by the Secretary of Agriculture No Drawing. Application June 3, 1949, Serial No. 97,072

2 Claims. (Cl. 260—78.5)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without payment to us of any royalty thereon.

This invention relates to plastic compositions, particularly to copolymers of unsaturated esters of phthalic acid with unsaturated esters of long chain aliphatic acids.

Diallyl phthalate, dimethallyl phthalate and 2-chloroallyl phthalate, form on polymerization clear, insoluble, infusible products which possess many desirable characteristics such as resistance to heat, aging, solvents, moisture and chemicals; good adhesive and electrical properties, dimensional stability, transparency and low pressure curing properties. Although the insolubility of these phthalates is a distinct advantage for many of their actual and potential uses, it is also a detriment in that these polymers are incompatible with modifiers such as plasticizing agents, thus limiting the range of properties obtainable in the final products.

We have found that these phthalates can be copolymerized singly or in combination, with allyl, methallyl and 2-chloroallyl esters of certain long chain aliphatic acids, thereby modifying the characteristics of and imparting desirable properties to the resulting copolymers. As a result of the conjoint polymerization of such monomer mixtures the long hydrocarbon chain of the aliphatic acid radical is made part of the copolymer molecules, thus imparting improved water resistance, lower brittle points and greater flexibility to the polymerization products.

Polymerizable, aliphatic acid esters adapted for use in the process of this invention are the allyl, methallyl and 2-chloroallyl esters of aliphatic, monocarboxylic acids containing from 6 to 18 carbon atoms, either saturated or unsaturated acids containing only one ethylenic linkage. Suitable esters include for example the allyl, 2-chloroallyl and 2-methallyl esters of caproic, caprylic, pelargonic, capric, lauric, myristic, palmitic, stearic, oleic and 10-hendecenoic acid.

In general, according to the invention a mixture of the monomeric phthalate, preferably diallyl phthalate, and at least one ester of the aforesaid type, preferably allyl stearate, polymerized by usual procedure such as with heat or light. Preferably polymerization is effected by heating the mixture at a temperature of about from 50° to 150° C. in the presence of a polymerization catalyst or initiator, such as free-radical producing substance, like benzoyl peroxide, or other organic peroxides; tertiary butyl perbenzoate; 2,2-bis (tertiary-butylperoxy) butane, or other similar compounds commonly utilized as catalytic agents in the production of high molecular polymers.

The polymerization process can be conducted either by bulk, suspension, emulsion, or redox-emulsion techniques. The copolymers can also be advantageously produced by a two step polymerization procedure wherein the monomeric mixture is first polymerized at a temperature within the range of about 50° to 100° C., and the resulting soluble "prepolymer" is then cured at a high temperature such as from about 100° to 150° C. to render it insoluble.

The properties of the copolymers of this invention, which are useful in the production of plastics, coating compositions, adhesives, and other similar products, can be varied by the choice of and the relative proportions of the individual components present in the monomer mixture and the conditions of polymerization.

The esters suitable for use in our process may be prepared, for example, by reacting allyl, methallyl or 2-chloroallyl alcohol with the long chain acid in the presence of an esterification catalyst and of an entraining agent according to the procedure described in J. Am. Chem. Soc. 70, 2334–2339 (1948) or by any other suitable methods, such as those described in our copending application Serial No. 48,542 filed September 10, 1948.

The invention is exhibited in greater detail as follows:

Mixtures of freshly distilled diallyl phthalate, an allyl ester of a long chain aliphatic acid, and benzoyl peroxide (1% by weight of the monomers) were prepared in a series of test-tubes which had been flushed with nitrogen, and were then polymerized by the procedure described by Guile and Huston, Laboratory Manual of Synthetic Plastics and Resinous Materials, 1944, p. 99.

The composition of the monomer mixtures and the physical properties of the resulting copolymerization products are shown in the following table:

| Composition of Monomer Mixture (in parts by weight) | | Polymerizate—Physical Appearance |
|---|---|---|
| Diallyl phthalate | Aliphatic Ester | |
| 100 | 0 | Tough, colorless gel. |
| | Allyl Caproate | |
| 99 | 1 | Tough, colorless gel. |
| 91 | 9 | Soft, colorless gel. |
| 80 | 20 | Do. |
| | Allyl Caprate | |
| 99 | 1 | Easily torn, colorless gel. |
| 91 | 9 | Soft, colorless gel. |
| 80 | 20 | Do. |
| | Allyl Myristate | |
| 99 | 1 | Tough, colorless gel. |
| 91 | 9 | Do. |
| 80 | 20 | Soft, colorless gel. |
| | Allyl Stearate | |
| 99 | 1 | Tough, colorless gel. |
| 91 | 9 | Soft, colorless gel. |
| 80 | 20 | Do. |
| 70 | 30 | Do. |

All of the copolymers are insoluble in boiling acetone or benzene, and in amyl acetate or acetic acid at 100° C.

Similar homogeneous copolymers are obtained by analogous procedures on using monomer mixtures containing from about one to about forty percent by weight of the ester.

Other polymerization catalysts can be used in place of benzoyl peroxide, and polymerization can be effected by maintaining the monomer mixture at any temperature within the range of about 50° to 150° C. for a sufficient length of time; the rate of polymerization increasing with the temperature.

Having thus described our invention, we claim:

1. A copolymer consisting of diallyl phthalate copolymerized with allyl stearate.

2. A copolymer consisting of diallyl phthalate copolymerized with a compound selected from the group consisting of allyl caproate, allyl caprate, allyl myristate and allyl stearate.

DANIEL SWERN.
EDMUND F. JORDAN, JR.

REFERENCES CITED

The following references are of record in the file of this patent:

UNITED STATES PATENTS

| Number | Name | Date |
|---|---|---|
| 2,332,461 | Muskat et al. | Oct. 19, 1943 |
| 2,402,486 | Adelson et al. | June 18, 1946 |
| 2,407,479 | D'Alelio | Sept. 10, 1946 |
| 2,527,597 | Swern et al. | Oct. 31, 1950 |
| 2,541,590 | Larsen et al. | Feb. 13, 1951 |